United States Patent [19]

Belgum

[11] Patent Number: 5,181,948
[45] Date of Patent: Jan. 26, 1993

[54] METHOD AND APPARATUS FOR FORMING MICROPIPETTE OF CONTROLLED CONFIGURATION

[75] Inventor: Jack H. Belgum, San Anselmo, Calif.

[73] Assignee: Sutter Instrument Company, Novato, Calif.

[21] Appl. No.: 729,439

[22] Filed: Jul. 12, 1991

[51] Int. Cl.⁵ ............................................. C03B 23/11
[52] U.S. Cl. ........................................ 65/105; 65/108; 65/112; 65/270; 65/271; 65/283; 219/121.73; 219/121.79; 219/121.8
[58] Field of Search ................. 65/105, 108, 112, 270, 65/283, 271, DIG. 4; 219/121.61, 121.62, 121.73, 121.79, 121.8

[56] References Cited

U.S. PATENT DOCUMENTS

| | | | |
|---|---|---|---|
| Re. 31,478 | 12/1983 | McArthur et al. | 219/121.8 |
| 3,154,371 | 10/1964 | Johnson | 219/121.8 |
| 3,388,461 | 6/1968 | Lins | 219/121.8 |
| 4,190,759 | 2/1980 | Hongo et al. | 219/121.79 |
| 4,600,424 | 7/1986 | Flaming | 65/108 |
| 4,869,745 | 9/1989 | Flaming | 65/108 |
| 4,913,719 | 4/1990 | Flaming | 65/108 |
| 4,921,522 | 5/1990 | Flaming | 65/108 |

Primary Examiner—Joye L. Woodard
Attorney, Agent, or Firm—McCubbrey, Bartels, Meyer & Ward

[57] ABSTRACT

A micropipette puller of the type having a laser for heating a length of capillary to be pulled is shown. Before intercepting the capillary, the laser beam is first passed through an aperture to reduce the beam width to a desired size. In one embodiment the aperture is made by a pair of movable shutters allowing the beam width to be adjusted. In this embodiment the spacing between the shutters can be made small in relation to the length of capillary to be heated and the resulting slit scanned back and forth along the capillary. Fixed, removable aperture plates means are also shown.

6 Claims, 3 Drawing Sheets

METHOD AND APPARATUS FOR FORMING MICROPIPETTE OF CONTROLLED CONFIGURATION

FIELD OF THE INVENTION

This invention pertains to devices for manufacturing micropipettes, and is particularly related to a micropipette puller of the type which employs a laser heat source.

BACKGROUND OF THE INVENTION

Micropipette pullers are known devices which are used to draw a capillary tube of a first diameter to have a portion with a much smaller diameter. An example of such a device is shown in U.S. Pat. No. 4,600,424. In such a device, a capillary tube of a type that is widely available commercially, is placed in the micropipette puller where it is held between two grippers. A central portion of the capillary, located between the grippers, is heated to a temperature at which the capillary is sufficiently soft to be pulled without breaking, but kept below a temperature at which it will sag under its own weight. Typically, heating of the capillary is accomplished using a filament comprising a metal band or wire that encircles the capillary. The grippers are then pulled apart causing the central portion of the capillary to stretch, thereby decreasing its diameter. The resulting reduced-diameter central portion of the capillary remains hollow. It is possible to obtain a micropipette having an internal diameter of 0.1 micron or less in this manner. When sufficiently pulled apart, the central portion of the micropipette separates, resulting in the formation of two micropipettes with extremely small hollow tips. These are especially useful in biological research where the micropipettes serve as microelectrodes that can be inserted directly into cells or other very fine biological structures and used, for example, to measure intracellular electrical phenomena. Alternately, the puller may be used in a manner which does not cause in separation of the micropipette, resulting in a tube having an "hourglass" configuration. Such a tube may then be cut in two. Such a technique is required when making micropipettes with a larger internal diameter than would result when the capillary is stretched to the point of separation.

The shape of the tip of the microelectrode is a significant factor in certain research applications and it is thus important to be able to reproducibly manufacture micropipettes with a desired profile. For a given capillary, the shape is a function of shape of the filament used in the puller, the proximity of the filament to the capillary, the temperature of the capillary when it is pulled, and the speed with which it is pulled. For example, a wide filament is used to create a long micropipette. Likewise, a filament that is held in close proximity to the capillary will result in a sharp heat gradient between the heated and unheated portion of the capillary. This will cause an initial fast taper of the capillary as it is pulled. If the filament is further from the capillary, the heat gradient will be more gradual and the micropipette will have a more uniform taper from its shoulder to the middle of the central portion.

The better micropipette pullers are now all computer controlled so that the variables in the pulling process, such as the filament temperature, length of the pull, the strength of the pull and the rate that the capillary is cooled, may be programmed into the puller. The only important variable which is not easily changed is the type of heating filament which is used. Efforts have been made to move the filament during the pulling cycle in order to heat a greater area, but the movement if the filament was slow and very difficult to control in a repeatable manner.

In many applications, the micropipettes and microelectrodes made using a puller of the type described would be enhanced if made of quartz. For a great many applications, quartz has better mechanical, optical, chemical and electrical properties than glass. For example, quartz is stronger, has a lower dielectric constant, is freer of contaminants, and is less fluorescent than glasses typically used for making capillaries. Unfortunately, quartz has a relatively high melting point (2100° C.), which is too high to permit softening by filaments. For example, a typical material used as a filament, platinum-iridium, has a melting point of 1815° C. Moreover, filaments evaporate during use which, even if the evaporation rate is low, may cause undesired contamination of the micropipette or microelectrode formed therefrom. The rate of evaporation increases as the temperature of the filament approaches its melting point.

Recently, there have been disclosed different embodiments of micropipette pullers utilizing a laser as a source of heat. A laser can generate a much hotter temperature since it is not limited by its own melting point. Thus, a laser is ideal for heating quartz to a working temperature. Moreover, the contamination problem described above, due to filament evaporation, is completely avoided. When using a laser, however, it becomes necessary to include means for distributing the laser beam, i.e., the source of heat energy, along a desired length of the capillary.

Two mechanisms for distributing the heat from a laser beam have been described in the prior art. In one mechanism, the heat is distributed using a stepper-motor controlled mirror which oscillates the laser beam along the length of the capillary. In the second, a lens system, such as a zoom lens or a shuttle assembly of different fixed lenses, is used to distribute the laser beam in a desired pattern.

These laser beam distribution mechanisms, while providing superior performance, are costly to build and must be maintained in good alignment. It has been found that there is a market demand for a lower cost yet reliable solution to the problem of controlling the heat distribution pattern of a laser beam used to heat a capillary in a micropipette puller.

Accordingly, it is an object of the present invention to provide a micropipette puller using a laser as a source of heat, which is able to control the area of the capillary which is heated.

Another object of the present invention is to provide a low cost means, in a micropipette puller, for controlling the portion of the capillary that is heated by a laser.

A further object of the present invention is to provide a micropipette puller which is able to reproducibly manufacture quartz micropipettes of a desired configuration.

Other objects and advantages of this invention will become apparent to those skilled in the art from the following description, particularly when read in conjunction with the accompanying drawings.

SUMMARY OF THE INVENTION

In a preferred embodiment of the present invention, a micropipette puller utilizes a laser as a heat source for softening the capillary to be pulled. The laser has a beam diameter which is sufficiently large to heat the longest desired length of capillary. If the laser beam is not wide enough, standard optical means may be used to widen the beam. Aperture means are provided for controlling the size of the laser beam which intercepts the capillary. In another embodiment the size of the laser beam which intercepts the capillary is varied by controlling the angle of the laser beam relative to the capillary.

DESCRIPTION OF A PREFERRED EMBODIMENT

Figure 1:
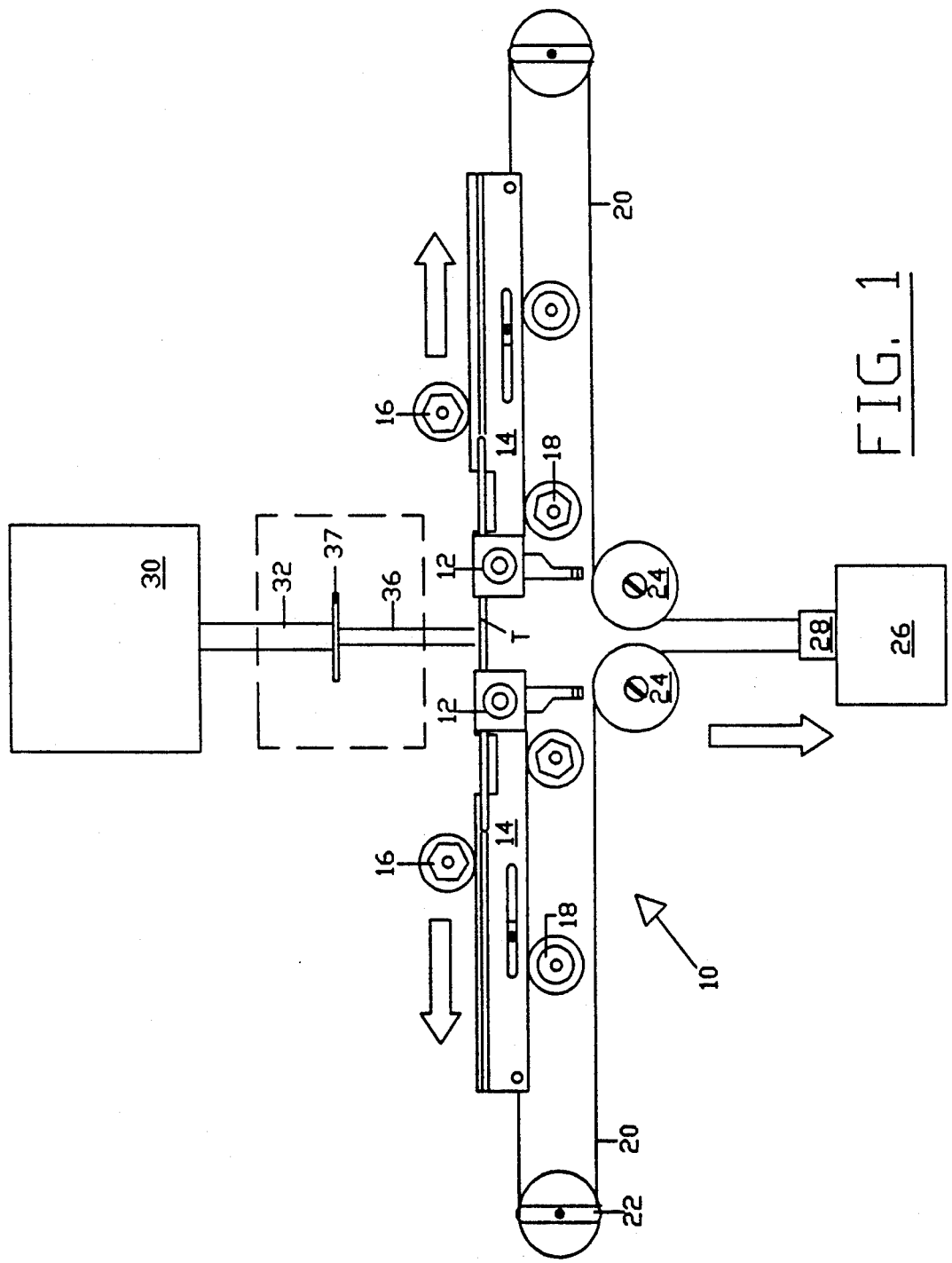
FIG. 1 is a schematic diagram of a micropipette puller of the present invention.

FIG. 1 shows a micropipette puller 10 of the present invention is schematic form. A capillary tube T, which may be made of glass, quartz, or the like, is placed in the puller where it is held by a pair of gripping jaws 12 on the adjacent ends of puller bars 14. When heat from a laser device 30 sufficiently softens the capillary tube, it is pulled apart, as described below, to form a micropipette.

A capillary having an outside diameter of 1 mm is particularly well suited for many applications. Such tubing is widely available commercially. However, for purposes of the present invention it is to be understood that larger diameter tubing may be utilized and such tubing is, therefore, to be understood to be within the scope of the term "capillary". For example, some artisans prefer to start with tubing that is of 2 mm outer diameter.

The puller bars 14 slide along upper and lower roller bearings 16 and 18, and can be pulled by cables 20 which extend over upper cable pulleys 22 and then over closely spaced central lower pulleys 24 to suspend the plunger of a solenoid 28. Pulling force is provided by the weight of the plunger and by energizing the solenoid coil 26.

Laser 30 produces a beam 32 of a given diameter. In a preferred embodiment laser 30 is a commercially available $CO_2$ laser with a nominal beam width of 3 mm. Aperture means 37 intercepts beam 32 resulting in a beam 36 of smaller diameter which intercepts capillary tubing T. The maximum length of the capillary tubing that can be heated is limited by the size of the laser beam 32. If the size of the laser beam is not sufficient to cover the largest anticipated desired length of capillary, beam 32 may first be expanded by standard optical means to a greater diameter. Alternately, the laser may be directed at aperture means 37 at an angle less than ninety degrees to effectively widen beam 32. This approach requires a corresponding offset of aperture means 37 to maintain alignment.

Figure 2:
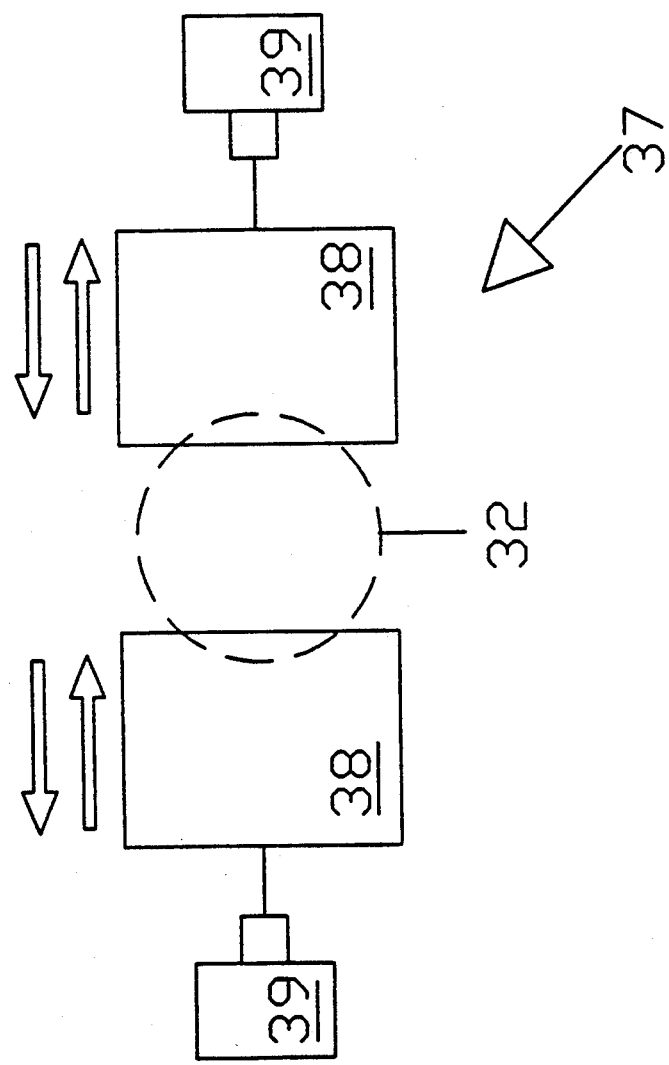
FIG. 2 is a schematic diagram of one embodiment of an apparatus for controlling the size of the laser beam used for heating a capillary in a micropipette puller according to the present invention.

In a preferred embodiment, shown in FIG. 2, aperture means 37 comprises movable metal shutters 38 which control the width of beam 36. The spacing of shutters 38 is controlled by linear actuators 39 attached to the shutters. Linear actuators 39, in turn, are controlled by the electronics system for the micropipette puller. The spacing of shutters 38 and, hence, the length of capillary exposed to beam 36, may thus be programmed by the device operator.

In this embodiment, shutters 38 can also be set so they are spaced apart a distance which is less than the desired width of capillary to be heated. Shutters 38 can then be moved simultaneously in the same direction to scan the length of capillary T to be heated. In such a scan the spacing between the shutters is, preferably, a small fraction of the overall length of capillary to be heated. Suitable actuators are available to allow repetitive scanning at a high rate, allowing the amount of exposure at any given point to be controlled by varying the speed of movement and the spacing of shutters 38. A predetermined heat distribution profile along the portion of the capillary to be heated may be obtained by varying the speed and separation of shutters 38 as a function of linear position relative to the capillary.

Figure 3:
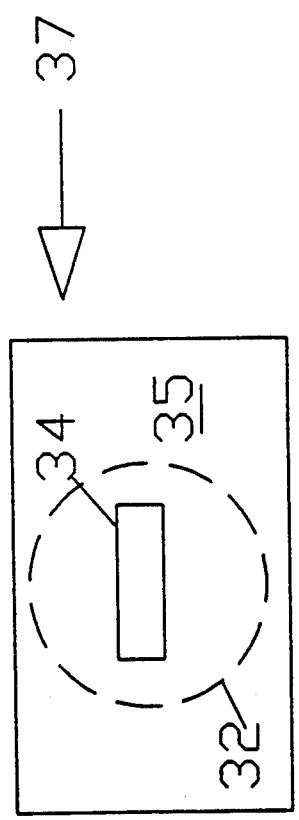
FIG. 3 is a schematic diagram of a second embodiment of an apparatus for controlling the size of the laser beam used for heating a capillary in a micropipette puller according to the present invention.

In a second embodiment, shown in FIG. 3, aperture means 37 comprising an aperture plate 35 with a fixed aperture 34, is employed to form a beam 36 of desired width. In this embodiment, which is the least costly to manufacture, aperture plate 35 may be removably mounted to allow the operator to change the size of aperture 34, and hence beam 36, by substituting a different aperture plate. While this approach provides the least flexibility, it is suitable for applications where the micropipette puller is used to repetitively manufacture a limited number of micropipette configurations. In a variation of this embodiment laser 30 may be rotated or otherwise displaced from a position perpendicular to the capillary T, so that the laser beam strikes at an angle to the capillary. This widens the portion of beam 36 that is intercepted by capillary T, thereby providing beam adjustability without the need to change the size of aperture 34. Of course, displacement of the laser from the perpendicular requires a corresponding displacement of aperture plate 35 to maintain alignment.

Although the present invention has been described in detail with reference to the embodiments shown in the drawings, it is not intended that the invention be restricted to such embodiments. It will be apparent to those skilled in the art that various modifications and departures from the foregoing description and drawings may be made without departing from the scope or spirit of the invention. Therefore, it is intended that the invention be limited only by the following claims.

What is claimed is:

1. A micropipette puller comprising:

gripper means for securely holding a length of capillary tubing at least two spaced apart points along the length thereof;

actuated pulling means for separating said gripping means;

laser means for providing a beam of laser light having a first diameter, said laser means aligned so that said laser beam intercepts a portion of said capillary tubing between said spaced apart points; and aperture means interposed between and in alignment with said laser means and said capillary tubing for reducing in at least one dimension said beam first diameter, thereby creating a reduced beam having a desired width, said aperture means being connected to translation means for scanning said reduced beam along a predetermined portion of said capillary tubing.

2. The micropipette puller of claim 1 wherein said aperture means comprises movable shutter means whereby the width of said beam may be adjusted.

3. The micropipette puller of claim 2, wherein said translation means comprises linear actuators connected to said movable shutter means.

4. A method of pulling a micropipette, comprising the steps of:

gripping at least two spaced apart portions of a length of capillary tubing;

heating a portion of said tubing between said gripped portions to a desired temperature using a beam emitted from a laser, said beam having a predetermined width, said predetermined width being less than the width of the beam emitted by the laser and set by aperture means;

scanning said laser beam over a portion of said capillary to be heated by moving said aperture means;

after said tubing has reached said desired temperature, pulling said capillary tubing.

5. The method of claim 4 wherein the scan speed is varied as a function of the linear position of the aperture means in relation to said capillary tubing.

6. The method of claim 4 wherein the width of the laser beam which strikes said capillary tubing is varied as a function of the linear position of the aperture means in relation to said capillary tubing.

* * * * *